United States Patent
Bower et al.

(10) Patent No.: US 8,587,858 B2
(45) Date of Patent: Nov. 19, 2013

(54) APPARATUS AND ASSOCIATED METHODS

(75) Inventors: Chris Bower, Ely (GB); Piers Andrew, Cambridge (GB); Robin H. A. Ras, Espoo (FI); Tuukka Verho, Helsinki (FI)

(73) Assignee: Nokia Corporation, Espoo (FI)

( * ) Notice: Subject to any disclaimer, the term of this patent is extended or adjusted under 35 U.S.C. 154(b) by 279 days.

(21) Appl. No.: 13/113,349

(22) Filed: May 23, 2011

(65) Prior Publication Data

US 2012/0300282 A1    Nov. 29, 2012

(51) Int. Cl.
*G02B 26/00* (2006.01)

(52) U.S. Cl.
USPC .......................................... 359/290; 359/291

(58) Field of Classification Search
USPC ......... 359/290–292, 237, 228, 230, 246, 272, 359/281, 298, 245, 316, 253; 345/228, 105, 345/107, 48, 49, 84; 430/321, 7, 330, 325, 430/48, 5; 204/192.18, 192.26, 472, 488, 204/547
See application file for complete search history.

(56) References Cited

U.S. PATENT DOCUMENTS

| | | | |
|---|---|---|---|
| 6,660,363 B1 | 12/2003 | Barthlott | 428/141 |
| 8,373,917 B2 * | 2/2013 | Chen et al. | 359/253 |
| 2006/0077330 A1 | 4/2006 | Ijzerman et al. | 349/143 |
| 2007/0009657 A1 | 1/2007 | Zhang et al. | 427/180 |
| 2009/0027751 A1 | 1/2009 | Chen et al. | 359/228 |
| 2009/0141335 A1 | 6/2009 | Feenstra et al. | 359/290 |
| 2009/0231670 A1 | 9/2009 | Bower et al. | 359/290 |
| 2011/0316764 A1 | 12/2011 | Parry-Jones et al. | 345/60 |

FOREIGN PATENT DOCUMENTS

| | | |
|---|---|---|
| EP | 1 350 575 A2 | 10/2003 |
| WO | WO 2004/104670 A1 | 12/2004 |
| WO | WO 2011/123515 A1 | 10/2011 |

OTHER PUBLICATIONS

Anish Tuteja et al., "Designing Superoleophobic Surfaces", vol. 318, (Dec. 7, 2007), (pp. 1618-1622).
Yong Chae Jung et al., "Mechanically Durable Carbon Nanotube Composite Hierarchical Structures with Superhydrophobicity, Self-Cleaning and Low Drag", vol. 3, No. 12, (2009), (pp. 4155-4163).
Tom Krupekin et al., "Electrically Tunable Superhydrophobic Nanostructured Surfaces", (2005), (pp. 161-170).
Lafuma, et al., "Superhydrophobic States", Nature Materials, vol. 2, No. 7, Jul. 2003, (pp. 1476-1122).
Shirtcliffe, et al., "An Introduction to Superhydrophobicity, Advances in Colloid and Interface Science", vol. 161, Issues 1-2, Dec. 2010, pp. 124-138.
Shirtcliffe, N. J. et al., "Plastron Properties of a Superhydrophobic Surface", © 2006 American Institute of Physics, 10 pgs.
Roach, P., et al., "Progress in Superhydrophobic Surface Development", © 2008 Royal Society of Chemistry, 29 pgs.

* cited by examiner

*Primary Examiner* — Thomas K Pham
*Assistant Examiner* — Brandi Thomas
(74) *Attorney, Agent, or Firm* — Harrington & Smith

(57) ABSTRACT

In one or more embodiments described herein, there is provided an apparatus including a support layer, a plurality of pixels, and a switch. The pixels are formed using an arrangement of respective liquid-phobic elements disposed on the support layer. The arrangement of the liquid-phobic elements is configured so as to be able to provide, when interacting with a liquid on the support layer, one or more associated plastron regions to provide a first pixel optical state. The switch is configured to be able to selectively modify one or more of said associated plastron regions to provide a second pixel optical state.

22 Claims, 6 Drawing Sheets

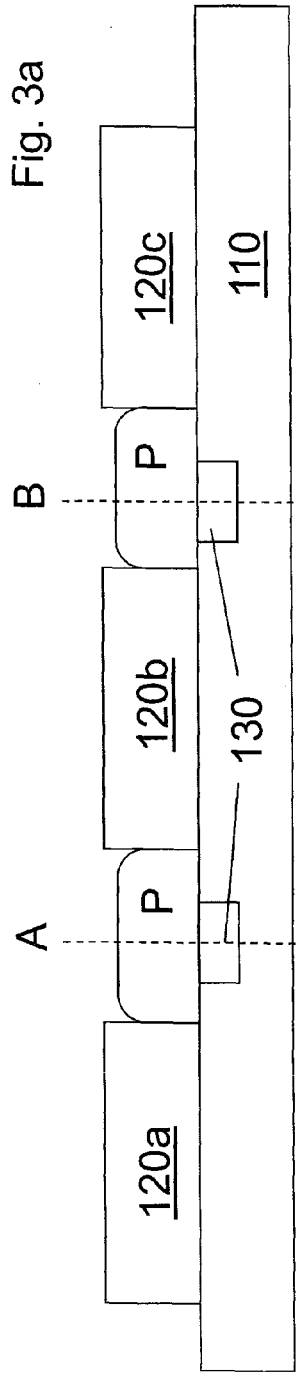
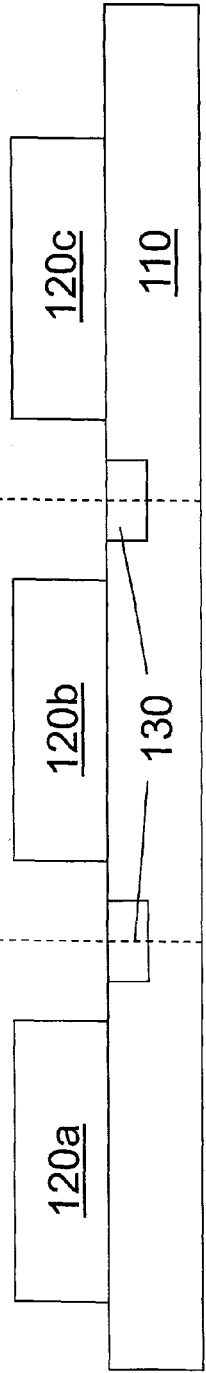
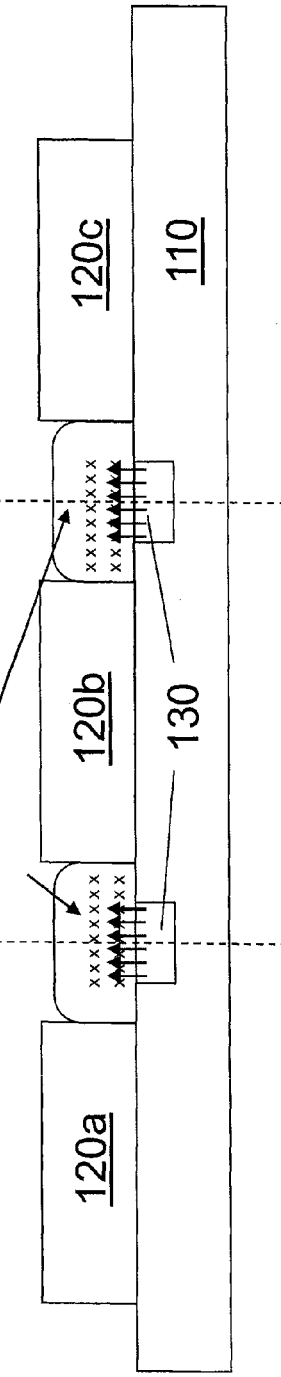

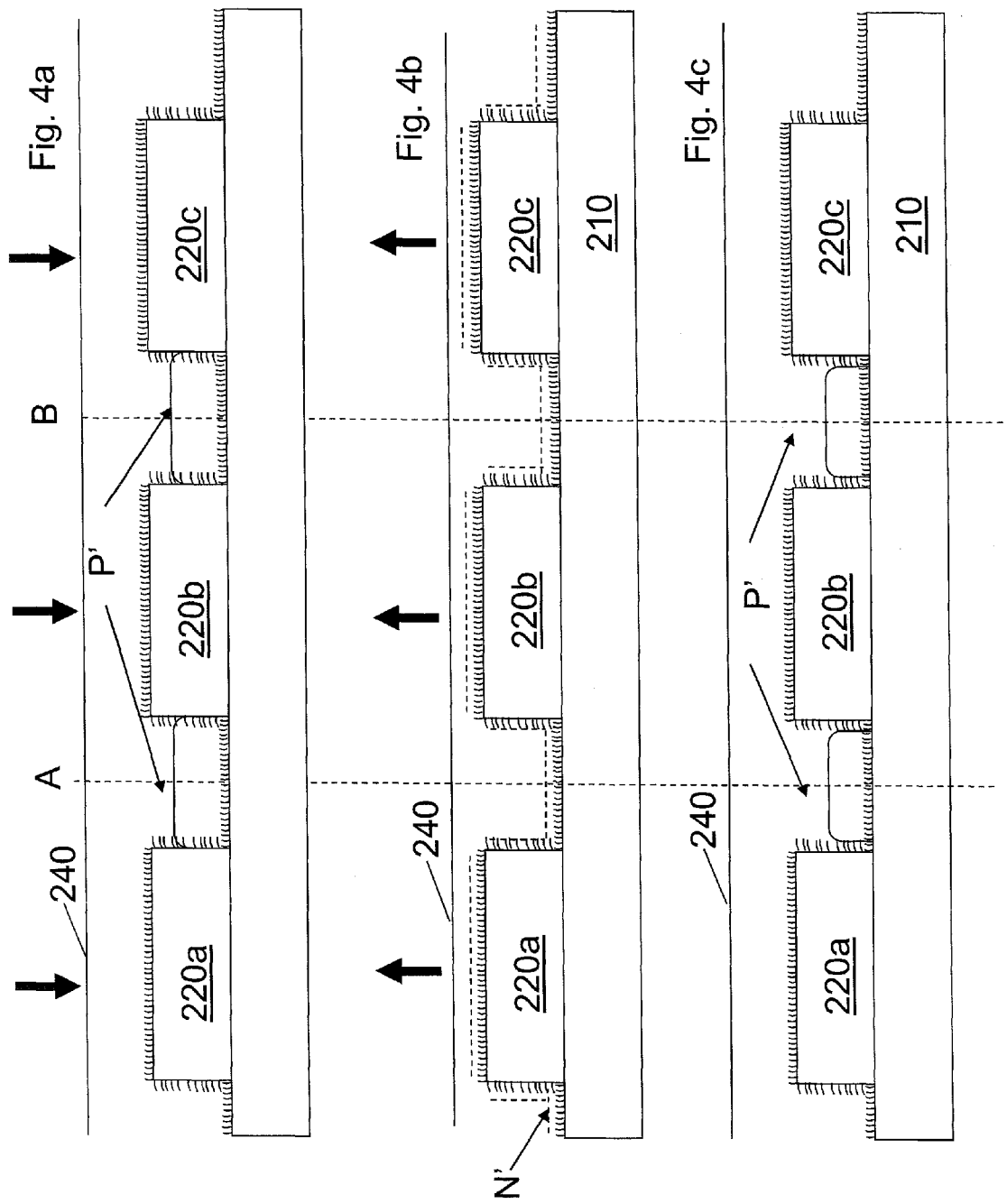

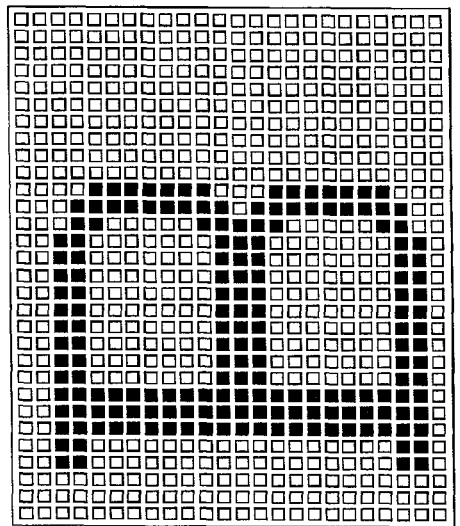
Fig. 5
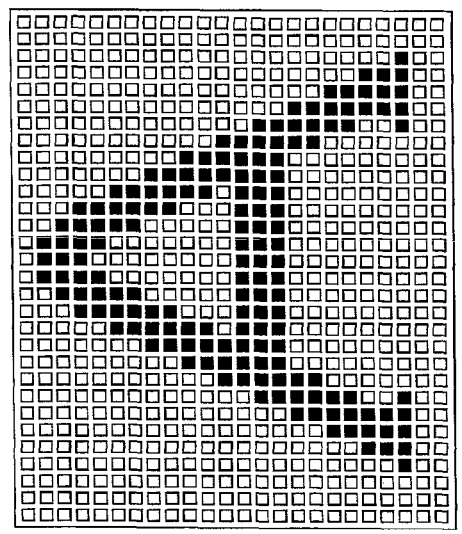
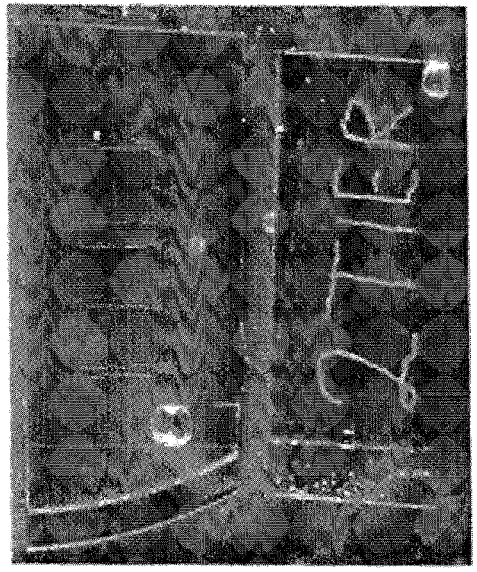
Fig. 7
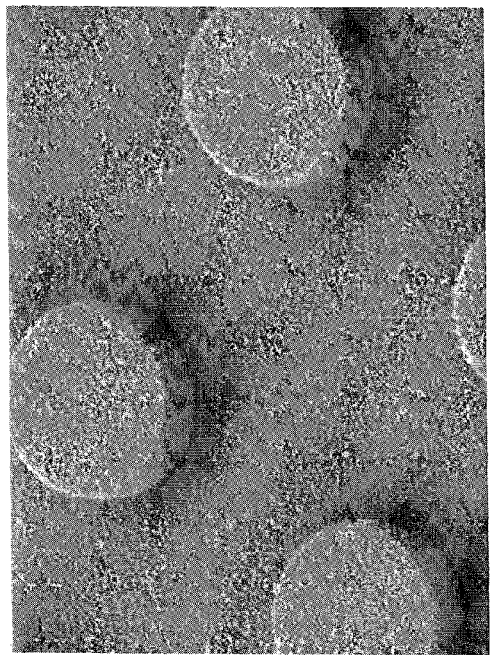
Fig. 6

APPARATUS AND ASSOCIATED METHODS

TECHNICAL FIELD

The present disclosure relates to the field of liquid-phobic surfaces/elements, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (for example, tele-communication, video-communication, and/or text transmission (Short Message Service (SMS)/Multimedia Message Service (MMS)/emailing) functions), interactive/non-interactive viewing functions (for example, web-browsing, navigation, TV/program viewing functions), music recording/playing functions (for example, MP3 or other format and/or (FM/AM) radio broadcast recording/playing), downloading/sending of data functions, image capture function (for example, using a (for example, in-built) digital camera), and gaming functions.

SUMMARY

An apparatus comprising:
a support layer; and
a plurality of pixels formed using an arrangement of liquid-phobic elements disposed on the support layer, the arrangement of the liquid-phobic elements being configured to provide, when interacting with a liquid on the support layer, one or more associated plastron regions to provide a first pixel optical state; and
a switch configured to be able to selectively modify one or more of said associated plastron regions to provide a second pixel optical state.

The support layer may also be liquid-phobic, or configured to be liquid-phobic.

The plastron region(s) may be a thin layer of air or other gas (for example, on the order of the thickness of the respective liquid-phobic elements).

Modification of the plastron regions may comprise collapsing and/or formation of respective plastron regions.

The liquid-phobic elements/pixels may be arranged to allow for the formation of one or more alphanumeric characters, Cyrillic characters, Greek characters, Roman numerals, Arabic numerals, Chinese/Japanese/Korean or other Asian language characters, seven-segment alphanumeric displays, or the like.

The pixels may provide for the formation of an image by the first and/or second pixel optical state contrasting with the optical state of the surroundings.

The surroundings may comprise the support layer and pixels in the second optical state.

The optical states may represent different levels of opacity.

The first pixel optical state may provide for a different opacity to the opacity of surrounding liquid on, or to be provided on, the support layer.

The second pixel optical state may be different to the first pixel optical state.

The liquid-phobic elements may be adjacently disposed on the support layer to provide for formation of a pixel pattern which allows for the control of the size and shape of a plastron region formed between the adjacent liquid-phobic elements when interacting with a liquid on the support layer.

The pixels may be formed using microscale liquid-phobic elements.

The apparatus may be configured to be able to provide for repeatable switching of one or more pixels between the first and second pixel optical states.

The pixels may be formed from the interaction of the liquid with the respective liquid-phobic elements.

The apparatus may comprise liquid provided on the support layer.

The liquid may be a water-based liquid and the liquid-phobic elements can then be hydrophobic.

The apparatus may comprise a random nanoscale texture or roughness disposed on the liquid-phobic elements and support layer.

The nanoscale texture may be configured to allow for dissipation of a plastron region in a first/second pixel optical state into a plurality of plastron sub-regions in a second/first pixel optical state.

The switch may comprise a heating element configured to induce cavitation in the plastron and cause formation of the plastron.

The heating element may be disposed internally to the support layer to heat the liquid directly to induce cavitation (i.e. bubble formation) and thereby cause plastron formation.

The heating element may be disposed externally to the support layer to heat the liquid directly and thereby heat the liquid indirectly to induce cavitation and thereby cause plastron formation.

The switch may comprise a pressure layer configured to be able to change the static pressure of the liquid and thereby cause at least collapse of particular plastron regions.

The liquid-phobic elements can be shaped to be one or more of: cylindrical, spherical, dome shaped, conical, cubic, cuboidal, or the like.

The liquid-phobic elements may be spaced apart from one another. The elements may be of the order of 10 micrometres in depth, width and height.

The apparatus could be one or more of the following:
a portable electronic device, a cellular telephone, a display, and a display for a portable electronic device/cellular telephone, or a module for one or more of the same.

An apparatus comprising:
a support layer; and
a plurality of pixels formed using an arrangement of liquid-phobic elements disposed on the support layer, the arrangement of the liquid-phobic elements being configured to provide, when interacting with a liquid on the support layer, one or more associated plastron regions to provide a first pixel optical state; and
a switch configured to be able to selectively modify one or more of said associated plastron regions to provide a second pixel optical state.

In another aspect, there is provided a method comprising:
fabricating an apparatus, comprising:
providing a support layer, a switch and an arrangement of a plurality of liquid-phobic elements disposed on the support layer, the arrangement of respective liquid-phobic elements providing for a plurality of pixels of the apparatus, the liquid-phobic elements configured to be able to provide, when interacting with a liquid on the support layer, one or more associated plastron regions to provide a first pixel optical state and the switch configured to be able to selectively modify one or more of said associated plastron regions to provide a second pixel optical state.

The disposing may comprise performing patterning or etching on the support layer to define the plurality of liquid-phobic elements.

The disposing may comprise affixing a plurality of liquid-phobic elements on the support layer.

In another aspect, there is provided a method comprising:

switching optical states of an apparatus, the apparatus comprising a support layer; and a plurality of pixels formed using an arrangement of liquid-phobic elements disposed on the support layer, the arrangement of respective liquid-phobic elements being configured so as to be able to provide, when interacting with a liquid on the support layer, one or more associated plastron regions to provide a first pixel optical state, the apparatus also comprising a switch configured to be able to selectively modify one or more of said associated plastron regions to provide a second pixel optical state, wherein the step of switching optical states comprises controlling the switch of the apparatus to move the apparatus from the first pixel optical state to the second pixel optical state.

In another aspect, there is provided a non-transitory computer program, storeable on a computer readable medium, being configured to, when run on a processor, perform at least the following:

switching optical states of an apparatus, the apparatus comprising a support layer; and a plurality of pixels formed using an arrangement of respective liquid-phobic elements disposed on the support layer, the arrangement of the liquid-phobic elements being configured so as to be able to provide, when interacting with a liquid on the support layer, one or more associated plastron regions to provide a first pixel optical state, the apparatus also comprising a switch configured to be able to selectively modify one or more of said associated plastron regions to provide a second pixel optical state, wherein the step of switching optical states comprises controlling the switch of the apparatus to move the apparatus from the first pixel optical state to the second pixel optical state.

In another aspect there is provided a computer readable medium comprising the computer program of the aspect immediately above being stored thereon.

In another aspect, there is provided an apparatus comprising:

a means for supporting; and a plurality of means for repelling liquid disposed on the support layer, the arrangement of the means for repelling liquid being configured so as to be able to provide, when interacting with a liquid on the means for supporting, one or more associated plastron regions to provide a first pixel optical state; and a means for switching configured to be able to selectively modify one or more of said associated plastron regions to provide a second pixel optical state.

In another aspect, there is provided an apparatus comprising:

a supporter; and a plurality of liquid repellers disposed on the supporter, the arrangement of the liquid repellers being configured so as to be able to provide, when interacting with a liquid on the supporter, one or more associated plastron regions to provide a first pixel optical state; and a switcher configured to be able to selectively modify one or more of said associated plastron regions to provide a second pixel optical state.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

It will be appreciated that reference to a single processor, memory or the like can also encompass more than one processor and memory.

The above summary is intended to be merely exemplary and non-limiting.

BRIEF DESCRIPTION OF THE FIGURES

A description is now given, by way of example only, with reference to the accompanying drawings, in which:—

FIGS. 3*a-c* illustrates operation of an embodiment.

FIGS. 4*a-c* shows another embodiment in operation.

FIG. 5 illustrates change of optical state of the apparatus between a first image and a second image.

FIG. 6 shows an example magnified surface of an embodiment.

FIG. 7 shows an example of an image provided by one or more embodiments.

DESCRIPTION OF EXAMPLE ASPECTS/EMBODIMENTS

Figure 1A:
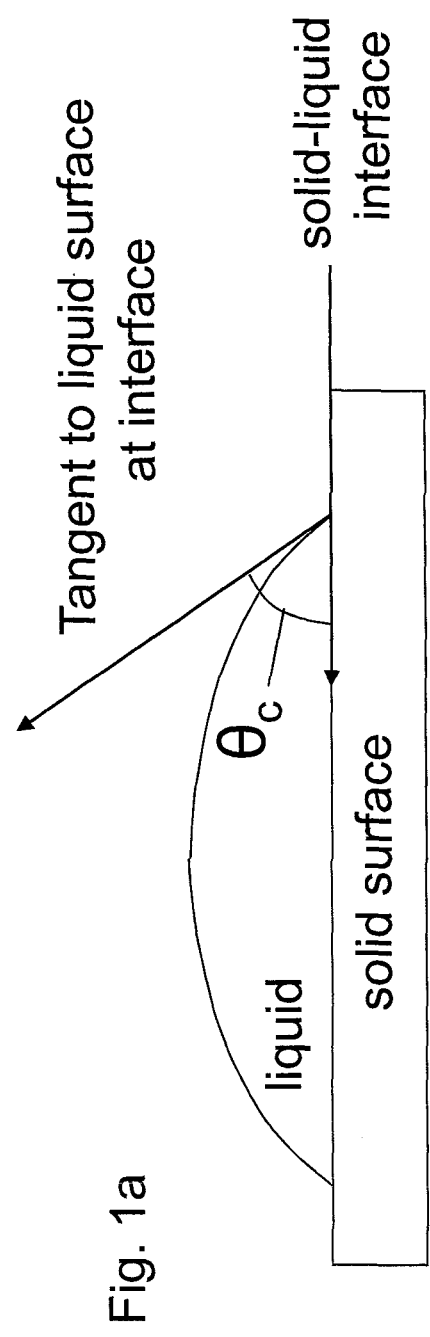
FIGS. 1*a-c* illustrates liquid droplets on a surface in different circumstances.

When a drop of water or any other liquid meets a surface, the balance of surface tension forces due to liquid/solid, liquid/gas and solid/gas contributions etc, define the shape of the liquid droplet that is formed at the solid-liquid-gas interface (in accordance with Young's equation). When liquid is added, this liquid droplet defines an advancing contact angle with the surface. This is illustrated in FIG. 1*a*, which shows how a liquid (for example, water) meets a solid surface (for example, a table top) and sits on that table top. The (advancing) contact angle, $\theta_c$, is defined between the plane of the surface and the tangent of the surface of the liquid at the point of the solid-liquid interface. For normal surfaces that do not repel liquids, this contact angle is typically <90°.

Figure 1B:
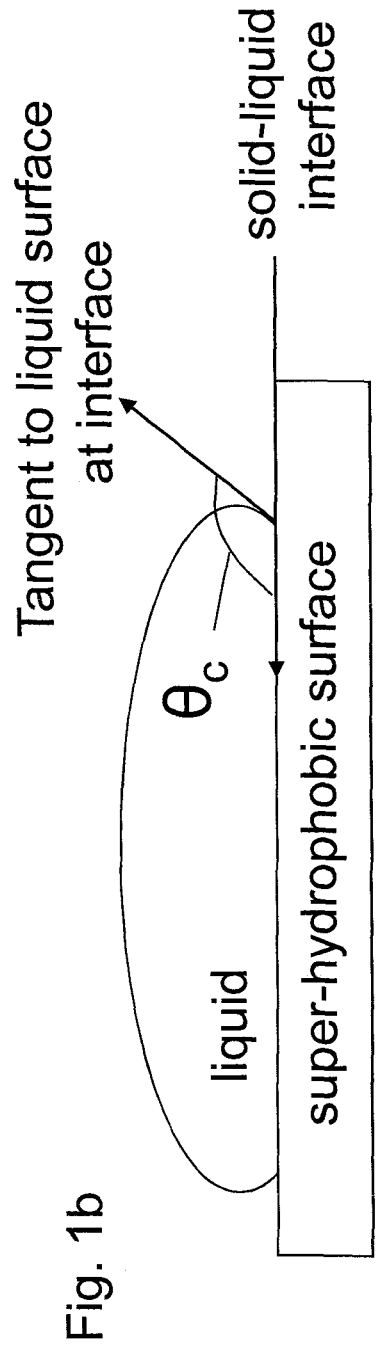

However, droplets formed on hydrophobic and super-hydrophobic surfaces (or other surfaces that repel other types of liquids that are not water based) behave somewhat differently. Because these surfaces repel a given liquid, the droplet sits slightly differently on the surface. This is illustrated in FIG. 1*b*, which shows how the contact angle, $\theta_c$, is obtuse rather than acute. Typically in hydrophobic/superhydrophobic surfaces this results in a large contact angle between the liquid and the solid surface (for example, over 90°, 120° or even over 150°).

As a result of this liquid repellant property, it is possible to trap a layer of air (or other lower density material) between the liquid and solid interface. Such trapped materials are called 'plastrons' when in that state. This situation with a stable air film at the interface is often called the 'Cassie' or 'Cassie-Baxter' wetting state.

The ability to trap plastron volumes/regions is something that is commonly used in nature, for example, to allow insects and arachnids to breath under water. They are generally random structures consisting of fine hairs or fibres which capture the air as a bubble layer of varying size and extent. The large refractive index contrast between the air and liquid gives rise to interesting optical properties, in particular, a high reflectivity that can give the plastron a silvery, mirror-like appearance. However, once these fine structures become fully wetted by the liquid it is difficult to re-establish the air film, and the ill defined geometry makes it difficult to utilize the optical properties effectively.

An overview of the use of plastrons by biological organisms as breathing membranes, and some methods of fabricating artificial structures for plastron capture is given in: "N. J. Shirtcliffe, G. McHale, M. I. Newton, C. C. Perry and F. B. Pyatt, Plastron properties of a superhydrophobic surface, Appl. Phys. Lett. 89 art 104106 (2006); DOI:10.1063/1.2347266".

Figure 1C:
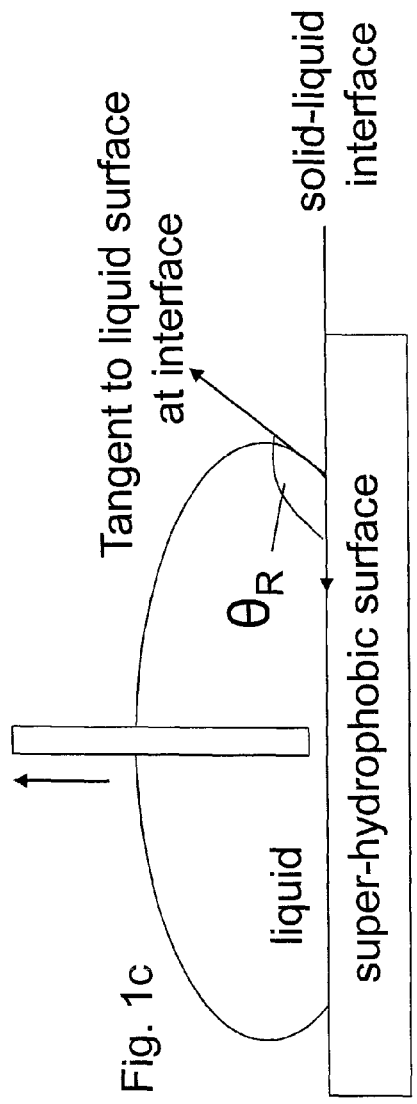

Returning to the figures, FIG. 1c shows that when the receding contact angle ($\theta_R$ shown in FIG. 1c, caused when a droplet is experiencing a force that is being exerted in a direction away from the solid surface) is of a similar magnitude to the advancing contact angle the surface can be considered to have very low contact angle hysteresis. In essence, liquids are seen to easily leave or 'de-wet' the surface in a manner similar to what looks like liquid droplets or marbles rolling off the surface without actually soaking or wetting the surface itself, thereby carrying dirt and contamination away from the surface. However, generally the Cassie state is only metastable, so the trapped air film collapses, and the liquid then completely wets the solid, often termed the 'Wenzel' wetting state.

These properties of such hydrophobic and liquid-phobic/liquid-repellant surfaces have numerous applications such as self-cleaning, drag reduction, and the like through plastron capture and control. All of these applications rely upon the ability of the surface to trap an air film (plastron) at the interface between a solid surface and a liquid disposed on that surface.

We will now describe one or more embodiments of the present disclosure that are described herein, in which there is provided an apparatus comprising a support layer, a plurality of pixels, and a switch. The pixels are formed using an arrangement of liquid-phobic elements disposed on the support layer. The arrangement of the liquid-phobic elements is configured so as to be able to provide, when interacting with a liquid on the support layer, one or more associated plastron regions to provide a first pixel optical state. The switch is configured to be able to selectively modify one or more of said associated plastron regions to provide a second pixel optical state.

By providing the liquid-phobic elements a first optical state can be achieved. In this first optical state the plastron regions (which can be likened to air bubbles that are created by virtue of the liquid-phobic elements coming into contact with liquid and adhere to those liquid-phobic elements) are seen to be reflective and metallic-looking. The pixels formed by the elements (for example, in the surrounding regions around and between the respective elements) therefore/thereby define a reflective image created by the layout of the plastron regions.

By providing the switch, it is further possible to move from that first optical state to a second optical state by selectively collapsing one or more of those plastron regions, or actually forming one or more plastron regions, or a combination of the two across respective regions. This allows the switch to alter which (if any) plastron regions are still present on the support layer 110 of the apparatus, which will therefore change the reflective image that can be viewed on the support layer. This therefore enables the apparatus to repeatedly change the image provided on the apparatus by selectively modifying (either by collapsing or forming/restoring) one or more of the plastron regions.

We will now describe a first embodiment with reference to FIG. 1.

Figure 2:
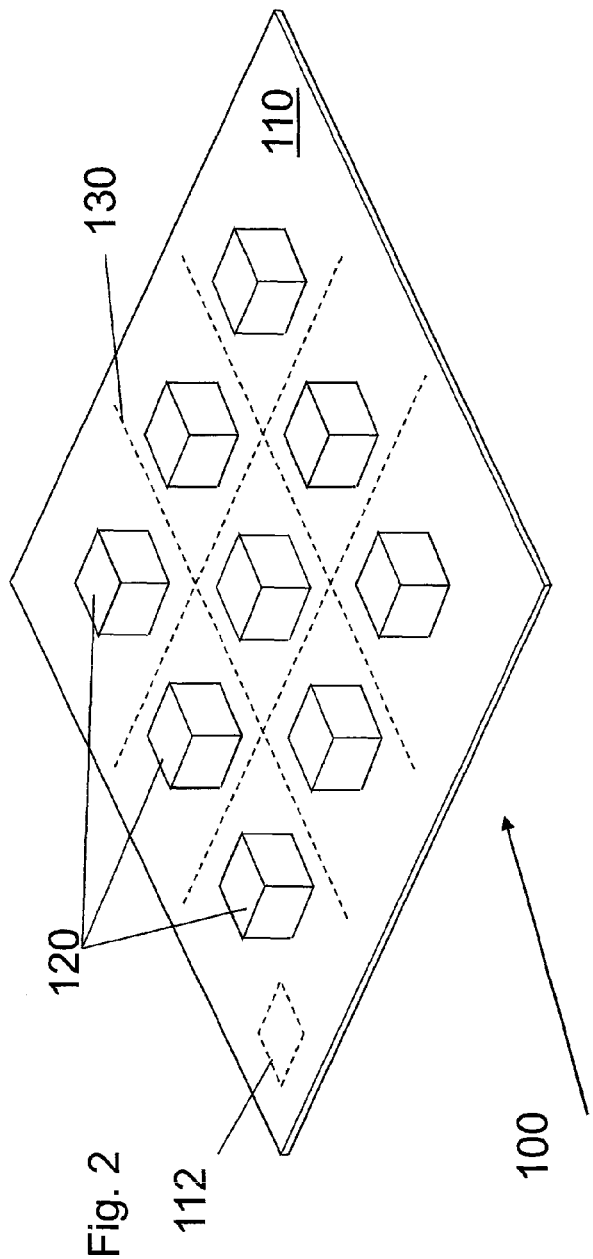
FIG. 2 illustrates a first embodiment of the present disclosure.

FIG. 2 illustrates an apparatus 100 having a support layer 110, a plurality of microstructure elements 120, a switch 112 (not shown) and heating elements 130. We will describe each of these elements in turn below.

The support layer 110 in this example is formed from a dielectric material and is essentially a substrate for supporting the microstructure elements 120 that are to be arranged on and affixed to the support layer 110. The support layer 110 can, of course, be formed from other materials with different properties, for example, it may be formed from a conductive material, or different semiconducting material, or insulating materials, or combination of these. In this example the support layer 110 is of the order of 0.5 to 1 mm thick to provide a substantially rigid support structure, but it could be thicker or thinner depending on the application required (for example, thinner to be more flexible, thicker to be more robust, etc).

The microstructure elements 120 are, in this embodiment, formed from silicon but may also by made from the same material as the support layer 110. In this embodiment the elements 120 are formed from cubes of approximately 10 micrometres in all dimensions. In other embodiments (such as that of FIG. 6) the microstructures can be cylindrical with a diameter and height on the order of 10 micrometres. In other embodiments the elements 120 can be formed from surface etching of the support layer or deposition of material onto the support layer 110 to provide a unitary structure with the microstructures being defined thereon. In any case, there are a number of different routes/methods that would allow for fabrication of this apparatus (for example, etching or deposition of a thick(er) support layer to define microstructure elements on the remaining thinner etched layer, or affixing of distinct elements onto a support layer, or the like).

The microstructure elements 120 are formed and arranged on the support layer 110 spaced apart from one another by approximately 10 micrometres so as to define channels/gaps between them. The elements 120 are arranged in this embodiment so as that the arrangement forms a square lattice/regular array type pattern, though other patterns can be used (for example, hexagonal lattice, regular or more irregular, etc). Although only nine elements are shown in FIG. 2, this is just an example of a few elements 120 and the pattern can repeat in both longitudinal and latitudinal directions as required.

The elements 120 are formed and treated so as to be hydrophobic, so that they repel water/water-based liquids. In addition, the top surface of the support layer 110 that will be interacting with a liquid at the same time as the elements 120 (to be disposed on the support layer 110) is configured to be liquid-phobic. In other embodiments these surfaces can be made to repel other liquids that are not water/water-based and are therefore liquid-repellant/liquid-phobic (for example, oleofins, and fluorinated materials, which are known as oleophobic surfaces). In this example the elements 120 are made to be superhydrophobic by controlled exposure with a fluoroalkylsilane material (though other chemical treatments are possible). This results in a lowering of the surface energy of the pillars. This results in the surface of the elements 120 having a large advancing contact angle for water of ~145 degrees, and a similarly large receding contact angle, resulting in low contact angle hysteresis (water drops can be seen to readily slide off such surfaces). The entirety of the exposed surfaces of each of the elements 120 can be configured to be liquid-phobic, or alternatively just the sides of the elements can be made to be liquid-phobic (e.g. not including the topmost surface).

It should be pointed out that in an embodiment where the support layer 110 is not configured to be liquid-phobic, then collapse of plastron regions would result in a completely wetted state on the corresponding areas of the support layer 110. If this occurs, then it is not typically possible to restore the pixel/plastron region providing such a pixel. In embodiments where the support layer 110 is liquid-phobic then the collective liquid-phobic surfaces are never fully in a wetted state (even after plastron collapse) and it is possible to restore said pixels/plastron regions.

In between each of the elements 120 are provided heating elements 130. These are electrically connected to and controlled by the switch 112 and are intended to introduce heat into the spacing surrounding any of the elements 120. In this embodiment they are simply small resistive wires embedded in the support layer 110 that heat up in response to the electrical current, but other heating alternatives which perform the required function are within the scope of the present disclosure. For example, Peltier elements could also be used. Such elements would be capable of both heating and cooling, which can enhance plastron manipulation. The function of all such elements will be explained below. The switch 112 can be controlled via an external processor to perform its switching function, but in any case it controls modification of particular plastron regions (not shown in FIG. 2) of the apparatus 100.

We will now describe the function of the embodiment of FIG. 2 with reference to FIGS. 3a-c. In these figures, a simplified version of the apparatus 100 shown in FIG. 2 is depicted, where only three elements 120 (120a-c) are shown to define two pixels 'A' and 'B'. The spacing between respective elements 120 (i.e. the surrounding regions around the respective grouping of elements 120) can be considered to denote respective 'pixels' that will make up a larger image—in this case pixels 'A' and 'B'. For example, a lattice of four square elements 120 (2×2) can define a single pixel at the centre of the square, delimited by the four inner corners of each of the square elements 120.

The heating elements 130 run underneath each of the 'pixel regions' in which plastron regions can be formed, sustained, or collapsed. In this example the apparatus 100 is bounded at its extremities (in other words, at the sides and above) to keep liquid contained within the apparatus but this is not shown (and in some embodiments need not be the case). Also, although FIGS. 3a-c show this example in one dimension for the sake of simplicity, it can of course be readily applied to two dimensions.

As a result of the hydrophobicity of the elements 120 (in other embodiments they can be liquid-phobic) and the surface of the support layer 110 between these elements, when the hydrophobic elements 120 are completely submerged or immersed in water, the elements 120 and the regions of the support layer surrounding those respective elements repel the water. The elements 120 can therefore be considered to act as liquid repellers that confine a plastron to a specific shape and location on the surface.

Without the hydrophobic elements 120, the location and extent of the plastron is somewhat unpredictable. However, because there is a whole array of elements 120 in a regular pattern, the otherwise random plastron regions are now formed in well defined regions, or what can be considered to be 'pixels' on the surface of the apparatus 100.

It should be pointed out that if the surface of the support layer is not liquid-phobic then it can be difficult to form a plastron in some configurations. This is because the liquid will typically enter into wet state on the surface of the support layer. However, in some embodiments it is possible to remedy this issue by providing the support layer with re-entrant features. Re-entrant features are small relief/topographical features on surfaces, such as mushroom or nail shaped structures that create overhangs which make it difficult for liquid to penetrate. These re-entrant structures can help encourage plastron formation without the support layer needing to be liquid-phobic. In such scenarios, surfaces can become completely non-wetting without necessarily being liquid-phobic surfaces per se.

Two of these pixel regions are shown marked 'P' in FIG. 3a, this is formed by virtue of each of the elements 120 being hydrophobic and confining the associated plastron between the elements. In effect, at least two elements 120 and the associated space between them can be considered to constitute a single pixel which can be used to make up a larger image. FIG. 3a is a simplification of what would be required to provide a particular pixel, and in reality an array of elements would need to be provided to define pixels in the spaces between them (e.g. between the four corners of a 2×2 array of elements).

This is shown in FIG. 3a which shows two plastron regions 'A' and 'B' in an optical state that is highly reflective and would be perceived by a user to be metallic looking due to the nature of the plastron regions, thus creating two reflective pixel regions on the apparatus 100.

Referring now to FIGS. 3b and 3c, the heating elements 130 are able to manipulate the pixel regions between each of the specific elements. Specifically, in FIG. 3b where the pixel regions 'A' and 'B' are completely wetted by the liquid, the heating elements 130 can be used to heat the pixel regions which causes cavitation within the liquid and causes the formation of a plastron in those pixels regions as is shown in FIG. 3c.

In essence, the heating elements can selectively create a particular plastron region provided by particular pixels to thereby change the perceived optical state from a first optical state in which a pixel is non-reflective to a second optical state in which the plastron region can be seen, and that pixel is now reflective in that region. This can also be considered to represent a change in opacity of a given pixel. The plastrons in the pixel regions can be destroyed by increasing the pressure in the liquid, which forces the liquid to wet the pixel region as will be described in more detail in the following section.

Alternatively, Peltier elements can be used to additionally cool a plastron region to cause collapse of a plastron region, thereby reversing the process of FIGS. 3b-3c. Heat can also be provided by a laser or other optical heating arrangements.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

We will now describe a second embodiment with reference to FIGS. 4a-c. This embodiment is substantially similar to the embodiment of FIG. 2 and FIGS. 3a-3c, except that all the surfaces of the elements 120 and support layer 110 are covered with a random nanoscale roughness or texture (alternatively, just some of the surfaces could be covered in this texture, e.g. just the support layer and the sides of elements).

In addition, this embodiment does not utilise heating elements but rather comprises a pressure layer 240. It should be noted that a number of different mechanisms can be provided to work with the switch to effect change of optical state in the apparatus 100, 200, and that it is not limited to just heating elements 130 or pressure layer 240, or just a combination of the two. Anything that would allow for (repeatable) destabilisation of a plastron region of one or more pixels can be utilised to collapse such regions and change the optical state of the apparatus.

The nanoscale roughness/texture is formed from a plurality of silicon nanofilaments deposited from methyltrichlorosilane, and the nanofilaments are rendered hydrophobic by deposition of a fluoroalkylsilane monolayer. In this way the apparatus 200 is provided with a support layer 210 with a microstructure formed thereon, and then a nanostructure formed on the exposed surfaces of apparatus again to provide a two-tier hierarchical superhydrophobic surface.

FIG. 6 shows a high resolution Scanning Electron Microscope (SEM) image of such a hierarchical surface, albeit with cylindrical pillar microstructural elements (10 μm wide, 10 μm tall separated by 10 μm). In this example, the pressure layer 240 abuts the upper surface of the liquid provided on the apparatus 200 to define what can be considered to be a single complete 'unit' (the edges are not shown in FIG. 4) such as a display for a portable electronic device like a cellular telephone).

The pressure layer 240 can be caused (by the switch) to decrease the distance between itself and the elements 220 and layer 210 and thereby change the hydrostatic pressure in the liquid contained by the apparatus 200. By decreasing the distance between the pressure layer 240 and the support layer 210 the pressure in the liquid can be increased and the plastron regions will collapse as a result of the increased in pressure, as they are relatively responsive to such changes in pressure. This is shown in FIGS. 4a-4b which depict a depression of the pressure layer 240 to collapse the plastron region P'.

Now, by providing the nanoscale roughness, the air (or lower density material) that was contained in the plastron region(s) P' is not dissipated but trapped within the nanostructure as plastron nano-regions or sub-regions N'. This means that while the microscopic plastron region has been 'destroyed', the change into this 'wetting' state results in the plastron material being stored 'invisibly' on a nanoscopic level. Through doing this, it is possible to actually restore the plastron region P'. This is possible because the dissipated plastron region is actually dispersed into a plurality of plastron nano-regions (or sub-regions) that are stored within the nanoscale roughness/texture on the various surfaces of the apparatus 200. Even without the nanostructure, (i.e. with just the microstructure), the plastron film can be created and destroyed by changing the liquid pressure, although this is much more reliable when the nanostructure is present.

In essence, the reason for this reversible wetting ability is that nanoscale roughness is never actually in a fully wetted state—even after collapse of a plastron into nano-regions stored the nanoscale roughness, the nanoscale roughness is not fully wetted, but could be considered to be in a 'pseudo-wet' state. Because the support layer is therefore never fully wetted, but can be observed to be in this 'pseudo-wet' state, this gives a mechanism by which one or more plastron regions can be collapsed and reversibly re-established. The nanoscale plastron is not visible to the human eye, and may extend over the entire substrate (thus providing the 'pseudo-wet' state), whilst the microscale plastron is highly reflective. The visible microscale plastron regions are delimited by the respective elements to define pixels.

Therefore, although the original plastron region is not visible (and therefore the pixels are not in the first optical state, but the second optical state) the air that made up that plastron region is still stored locally but in a non-visible or at least different visible state, so that when the pressure layer 240 decreases the previously increased pressure (in other words, restore the original hydrostatic pressure in the liquid) the plastron region can be restored because conditions in the liquid permit this to happen. This can be considered to provide a bi-stable arrangement/configuration in which the apparatus can reversibly switch back and forth between the first and second pixel optical states.

Although a single pressure layer 240 is used here and all the pixels are 'globally' altered so as to be moved into the second optical state, it is possible to perform localised pressure changes (for example, raising/lowering individual elements/pixels to disrupt and collapse respective plastron regions) to thereby selectively collapse (or also restore) particular plastron regions in the apparatus 200.

FIG. 5 shows how pixels can be made to be in a reflective state (represented by the black pixels) so as to provide a first image—namely the letter 'A'—and can then be repeatedly switched back and forth through collapsing/restoring of plastron regions across those pixels to another image—namely the letter 'B'. This can allow for a modifiable display to be provided by the apparatus 200 through reversible wetting states (in other words, between the 'de-wetted' and 'wetted' states that provide the first and second optical states respectively). It should be pointed out that the black squares represent the pixels defined surrounding liquid-phobic elements that define/delimit the plastron regions forming those pixels, and the white squares represent pixels defined/delimited by the surrounding liquid-phobic elements but actually lacking any plastron region(s). An image can also be formed in the reverse manner, whereby the plastron regions form the 'negative' of an image and the absence of plastron regions define the image to be displayed.

In particular, the surface configuration shown in FIG. 6 was unexpectedly found to show improved reversibility from the completely wetting Wenzel state to the non-wetting Cassie state, since it appears that the nanoscale roughness traps a very stable air film. It also has much improved optical properties compared to the non-hierarchical surface.

FIG. 7 shows a comparison of the reflectivity obtained from the plastron layers on both the regular micro-patterned surface (top image) as per the embodiment of FIGS. 3a-3c, compared to the same surface which also has nanostructures in addition to the microstructures to create a hierarchical substrate (bottom image) as per the embodiment of FIGS. 4a-c. This shows the difference in clarity and resolution between the apparatus 100 and apparatus 200. Apparatus 200 can be considered to have a hierarchical two-tier layering (by way of the nanoscale roughness and the microscale microstructures) while apparatus 100 can be considered to be of a single-tier formed from the microstructure elements 120. The two-tier hierarchy helps to enhance the resolution and crispness of an image provided by the plastron regions, giving more defined edges than the one-tier arrangement, and the reflectivity is also increased to give a stronger contrast between the first optical state of the coalesced plastron regions of the respective pixels and the comparative surroundings of the apparatus.

In another embodiment, a pressure layer 240 is not used but the apparatus 200 is provided with heating elements (not shown) like in the first embodiment. Similarly, when heat is applied to a particular pixel region a plastron is created in that region.

In essence, the respective apparatus 100, 200 described above provide surfaces having a regular pattern of at least microscale features that can (reversibly) confine and trap plastron regions with well controlled geometry, such that discrete regions of the plastron analogous to 'pixels' can be created or destroyed to achieve controlled optical effects.

Apparatus 200 provides a regular microscale roughness with a random nanoscale roughness to create a hierarchical roughness structure that shows a further improved optical contrast and improved reversibility of switching due to the enhanced plastron confinement. This can provide enhanced reflective displays for various devices, and offers enhanced microfluidic control methods.

A further implementation uses similar microstructure elements that can be created in sapphire or some other corundum material so as to provide enhanced abrasion resistance. The nanostructures in such an implementation can be created in a similar manner as the above example of apparatus 200 using silicon nanofilaments or silica nanoparticles or other nanoscopic hydrophobic particles. Potentially delicate nanostructures are then protected by the hard microstructures.

Figure 8:
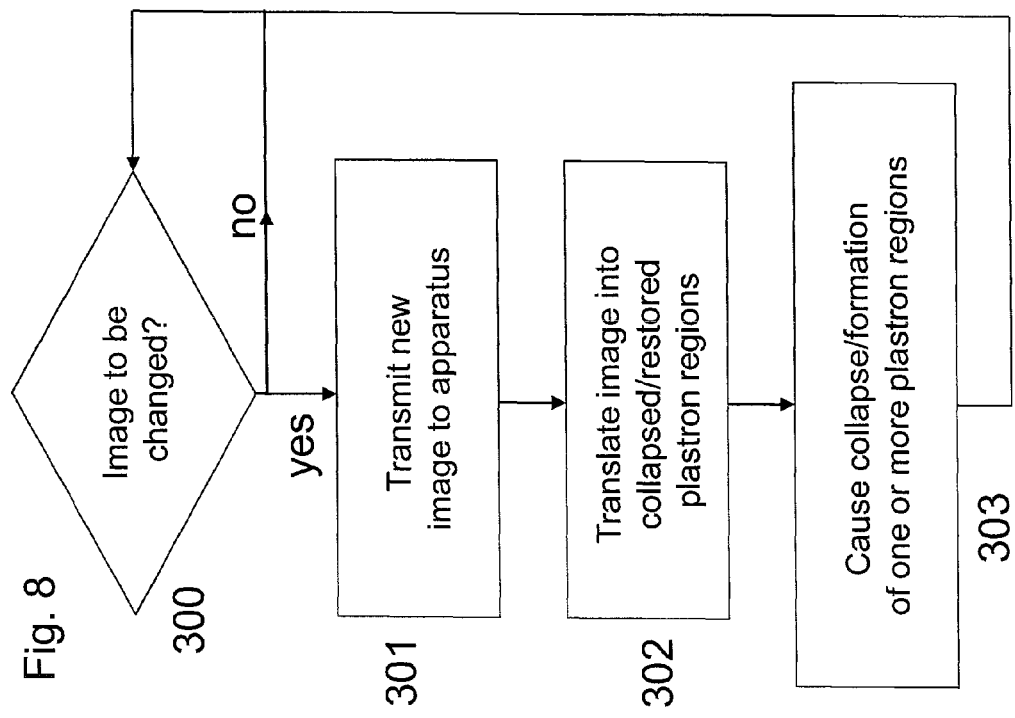
FIG. 8 shows a method according to an embodiment of the present disclosure.

FIG. 8 illustrates a method of operation of another embodiment. This describes how the apparatus 100 or 200 can be controlled via the switch to display a particular image (in other words, changing from a first optical state to a second optical state). Firstly, it is assessed in step 300 whether the image is to be changed. If no, then the process simply cycles repeatedly round this step until the image does need to be changed. If the image does need to be changed (the answer being 'yes' to the first step 300) then the process continues to step 301, in which the image to be displayed is transmitted to the apparatus 100/200. At step 302 the image is translated or 'mapped' from its digital representation into the requisite plastron regions that should be present on the apparatus 100/200 to display that image to a user. At step 303 the switch controls switching of the apparatus (e.g. via the heating elements, pressure layer, or the like) to collapse/restore plastron regions to change particular regions into a different optical state to thereby change the overall image presented on the apparatus.

Figure 9:
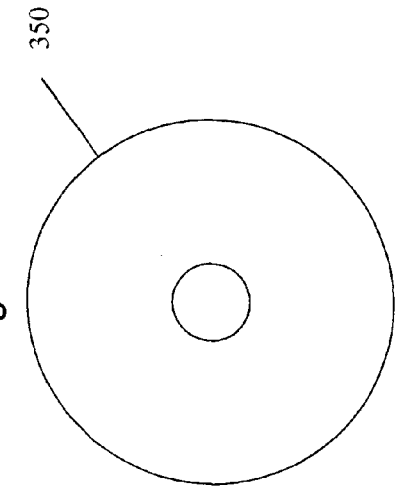
FIG. 9 illustrates schematically a computer readable media providing a program according to an embodiment of the present disclosure.

FIG. 9 illustrates schematically a computer/processor readable media 350 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

Figure 10:
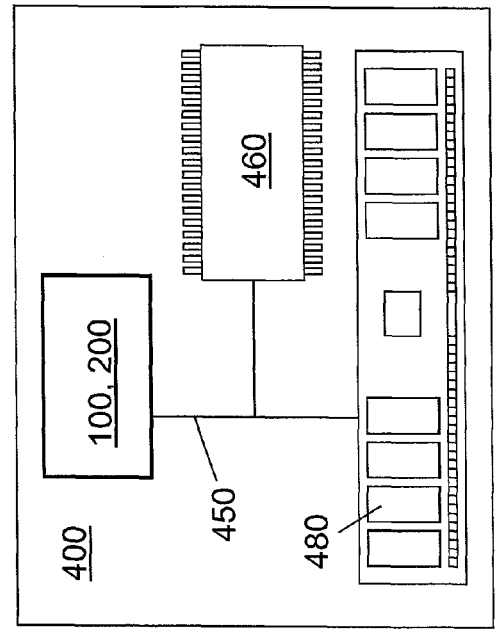
FIG. 10 illustrates another embodiment of the present disclosure.

FIG. 10 illustrates schematically a device 400 comprising the apparatus 100 or 200 described herein. The device 400 also comprises a processor 460 and a storage medium 480, which may be electrically connected to one another by a data bus 450. The device 400 may be an electronic device, a portable electronic device, a portable telecommunications device, or a module for any of the aforementioned devices. The apparatus 100 can be provided as a module for such a device 400, or even as a processor for the device 400 or a processor for a module for such a device 400.

The storage medium 480 has computer program code stored thereon and the medium 480 and program code are configured to, when run on the processor 460, to control the switching of the apparatus 100, 200, via the data bus 450, as to which regions to collapse (and/or restore) to change from one optical state to another to thereby change the image on the apparatus 100, 200.

The processor 460 is configured for general operation and control of the apparatus 100 by providing signalling to, and receiving signalling from, the other device components to manage their operation.

The storage medium 480 is configured to store computer code configured to perform, control or enable the making and/or operation of the apparatus 100. The storage medium 480 may also be configured to store settings for the other device components. The processor 460 may access the storage medium 480 to retrieve the component settings in order to manage the operation of the other device components. The storage medium 480 may be a temporary storage medium such as a volatile random access memory. On the other hand, the storage medium 480 may be a permanent storage medium such as a hard disk drive, a flash memory, or a non-volatile random access memory.

It will be appreciated to the skilled reader that any mentioned apparatus/device/server and/or other features of particular mentioned apparatus/device/server may be provided by apparatus arranged such that they become configured to carry out the desired operations only when enabled, for example, switched on, or the like. In such cases, they may not necessarily have the appropriate software loaded into the active memory in the non-enabled (for example, switched off state) and only load the appropriate software in the enabled (for example, on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (for example, memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (for example, including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   a support layer; and
   a plurality of pixels formed using an arrangement of respective liquid-phobic elements disposed on the support layer, the arrangement of liquid-phobic elements being configured so as to be able to provide, when interacting with a liquid on the support layer, one or more associated plastron regions to provide a first pixel optical state; and
   a switch configured to be able to selectively modify one or more of said associated plastron regions to provide a second pixel optical state.

2. The apparatus of claim 1, wherein the support layer is configured to be liquid-phobic.

3. The apparatus of claim 1, further comprising a processor, and a memory having computer program code stored thereon, the memory and computer program code being configured to, when run on the processor, cause the apparatus to control switching of the switch to be able to move the apparatus from the first pixel optical state to the second pixel optical state.

4. The apparatus of claim 1, wherein the pixels provide for the formation of an image by the first or second pixel optical state contrasting with the optical state of the surroundings.

5. The apparatus of claim 1, wherein the surroundings comprises the support layer and pixels in the second optical state.

6. The apparatus of claim 1, wherein the first pixel optical state provides for a different opacity to the opacity of surrounding liquid on, or to be provided on, the support layer.

7. The apparatus of claim 1, wherein the second pixel optical state is different to the first pixel optical state.

8. The apparatus of claim 1, wherein liquid-phobic elements are adjacently disposed on the support layer to provide for formation of a pixel pattern which allows for the control of the size and shape of a plastron region formed between the adjacent liquid-phobic elements when interacting with a liquid on the support layer.

9. The apparatus of claim 1, wherein the pixels are formed using microscale liquid-phobic elements.

10. The apparatus of claim 1, wherein the apparatus is configured to be able to provide for repeatable switching of one or more pixels between the first and second pixel optical states.

11. The apparatus of claim 1, comprising a liquid on the support layer.

12. The apparatus of claim 1, comprising a water-based liquid on the support layer and the liquid-phobic elements are hydrophobic.

13. The apparatus of claim 1, wherein the apparatus comprises a random nanoscale texture disposed on the liquid-phobic elements and support layer.

14. The apparatus of claim 13, wherein the nanoscale texture is configured to allow for dissipation of a plastron region in a first pixel optical state into a plurality of plastron sub-regions in a second pixel optical state.

15. The apparatus of claim 1, wherein the switch comprises a heating element configured to induce cavitation in the regions surrounding one or more of said pixels to cause plastron formation in those pixel regions.

16. The apparatus of claim 15, wherein the heating element is disposed:
   internally to the support layer to heat the pixel region directly to induce cavitation and thereby cause plastron formation; and/or
   externally to the support layer to heat the liquid directly and thereby heat the pixel region indirectly to induce cavitation and thereby cause plastron formation.

17. The apparatus of claim 1, wherein the switch comprises a pressure layer configured to be able to change the static pressure of liquid provided on the support layer of the apparatus and thereby cause collapse and/or formation of particular respective plastron regions.

18. The apparatus of claim 1, wherein one or more of the liquid-phobic elements are shaped to be one or more of:
   cylindrical, spherical, dome shaped, conical, cubic, and cuboidal.

19. The apparatus of claim 1, wherein the apparatus is one or more of:

a portable electronic device, a cellular telephone, a display, and a display for a portable electronic device/cellular telephone, or a module for one or more of the same.

20. A method comprising:

switching optical states of an apparatus, the apparatus comprising a support layer; and a plurality of pixels formed using an arrangement of liquid-phobic elements disposed on the support layer, the arrangement of respective liquid-phobic elements being configured so as to be able to provide, when interacting with a liquid on the support layer, one or more associated plastron regions to provide a first pixel optical state, the apparatus also comprising a switch configured to be able to selectively modify one or more of said associated plastron regions to provide a second pixel optical state, wherein the step of switching optical states comprises controlling the switch of the apparatus to move the apparatus from the first pixel optical state to the second pixel optical state.

21. A non-transitory computer program, storeable on a computer readable medium, being configured to, when run on a processor, perform at least the method of claim 19.

22. A method comprising:

fabricating an apparatus, comprising:

providing a support layer, a switch and an arrangement of a plurality of liquid-phobic elements disposed on the support layer, the arrangement of respective liquid-phobic elements providing for a plurality of pixels of the apparatus, the liquid-phobic elements configured to be able to provide, when interacting with a liquid on the support layer, one or more associated plastron regions to provide a first pixel optical state and the switch configured to be able to selectively modify one or more of said associated plastron regions to provide a second pixel optical state.

* * * * *